(12) United States Patent
Asmar et al.

(10) Patent No.: US 10,055,919 B2
(45) Date of Patent: Aug. 21, 2018

(54) RELAY-ATTACK DETERRENCE
RELAY-ATTACK DETERRENCE

(71) Applicant: GM GLOBAL TECHNOLOGY OPERATIONS LLC, Detroit, MI (US)

(72) Inventors: Ron Y. Asmar, West Bloomfield, MI (US); Thomas E. Utter, Royal Oak, MI (US); Thomas M. Forest, Macomb, MI (US); Aaron P. Creguer, Fenton, MI (US); David T. Proefke, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/598,720

(22) Filed: May 18, 2017

(65) Prior Publication Data

US 2017/0352211 A1 Dec. 7, 2017

Related U.S. Application Data

(60) Provisional application No. 62/344,049, filed on Jun. 1, 2016.

(51) Int. Cl.
| | |
|---|---|
| *G07C 9/00* | (2006.01) |
| *B60R 25/04* | (2013.01) |
| *B60R 25/24* | (2013.01) |
| *G06K 19/07* | (2006.01) |

(52) U.S. Cl.
CPC .......... *G07C 9/00309* (2013.01); *B60R 25/04* (2013.01); *B60R 25/241* (2013.01); *G06K 19/0724* (2013.01); *G07C 2009/00555* (2013.01)

(58) Field of Classification Search
CPC ...... G07C 9/00309; G07C 2009/00555; B60R 25/04; B60R 25/241; G06K 19/0724
USPC ......................................................... 340/5.61
See application file for complete search history.

(56) References Cited

U.S. PATENT DOCUMENTS

| | | | | |
|---|---|---|---|---|
| 2002/0033752 | A1* | 3/2002 | Greenwood | .......... B60R 25/246 340/5.61 |
| 2006/0114100 | A1* | 6/2006 | Ghabra | .................. E05B 81/78 340/5.61 |
| 2010/0321154 | A1* | 12/2010 | Ghabra | .................. B60R 25/00 340/5.61 |
| 2013/0143594 | A1* | 6/2013 | Ghabra | ................. H04W 24/00 455/456.1 |
| 2013/0271273 | A1* | 10/2013 | Oesterling | ......... G07C 9/00309 340/426.18 |
| 2013/0298208 | A1* | 11/2013 | Ayed | ....................... G06F 21/00 726/6 |

(Continued)

*Primary Examiner* — Edwin Holloway, III
(74) *Attorney, Agent, or Firm* — Lorenz & Kopf, LLP

(57) ABSTRACT

A relay attack deterrence system includes a mobile platform including a plurality of mobile platform transmitter components and a mobile platform receiver component provided therein. The system further includes a fob device having a fob receiver component, a fob transmitter component, and a motion sensor component configured to produce motion information. The fob device is configured to receive, at the fob receiver component, one or more first signals from at least one of the plurality of mobile platform transmitter components and to selectably transmit, to the mobile platform receiver component, a second signal based on the motion information and position information derived from the one or more first signals.

20 Claims, 3 Drawing Sheets

(56) References Cited

U.S. PATENT DOCUMENTS

| | | | |
|---|---|---|---|
| 2014/0375420 A1* | 12/2014 | Seiberts | B60R 25/2072 340/5.31 |
| 2014/0375423 A1* | 12/2014 | Lagabe | B60R 16/02 340/5.61 |
| 2016/0075307 A1* | 3/2016 | Jakobsson | B60R 25/31 701/2 |
| 2016/0140539 A1* | 5/2016 | Ma | G06Q 20/3278 705/73 |

* cited by examiner

RELAY-ATTACK DETERRENCE
RELAY-ATTACK DETERRENCE

CROSS-REFERENCE TO RELATED APPLICATIONS

This application claims priority from U.S. Provisional Patent App. No. 62/344,049, filed Jun. 1, 2016, the contents of which are hereby incorporated by reference.

TECHNICAL FIELD

The technical field generally relates to security systems used in connection with moving platforms such as automotive vehicles. More particularly, the technical field relates to systems and methods for preventing relay-attack and other such security risks in the context of wireless communication systems.

BACKGROUND

Mobile platforms such as automotive vehicles, marine vessels, and the like often employ an electronic key fob device to effect entry (e.g., passive entry) and/or activation (e.g., passive starting) of the mobile platform. Such systems generally employ various low frequency and high frequency RF receivers/transmitters to establish communication between the mobile platform and the fob device, thereby determining an action to be taken based on, for example, the proximity of the key fob to the mobile platform.

Unfortunately, key fob devices and their associated mobile platforms are subject to a variety of attacks. One such attack, for example, is the relay attack, wherein one or more parties employ electronic devices that wirelessly communicate with the key fob device and the mobile platform in such a way that the system is tricked into believing that the correct conditions are met for effecting entry and/or activation of the mobile platform, even when the fob device is a substantial distance away from the mobile platform.

Accordingly, it is desirable to provide improved key fob systems that deter relay-attacks and other security risks. Other desirable features and characteristics will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
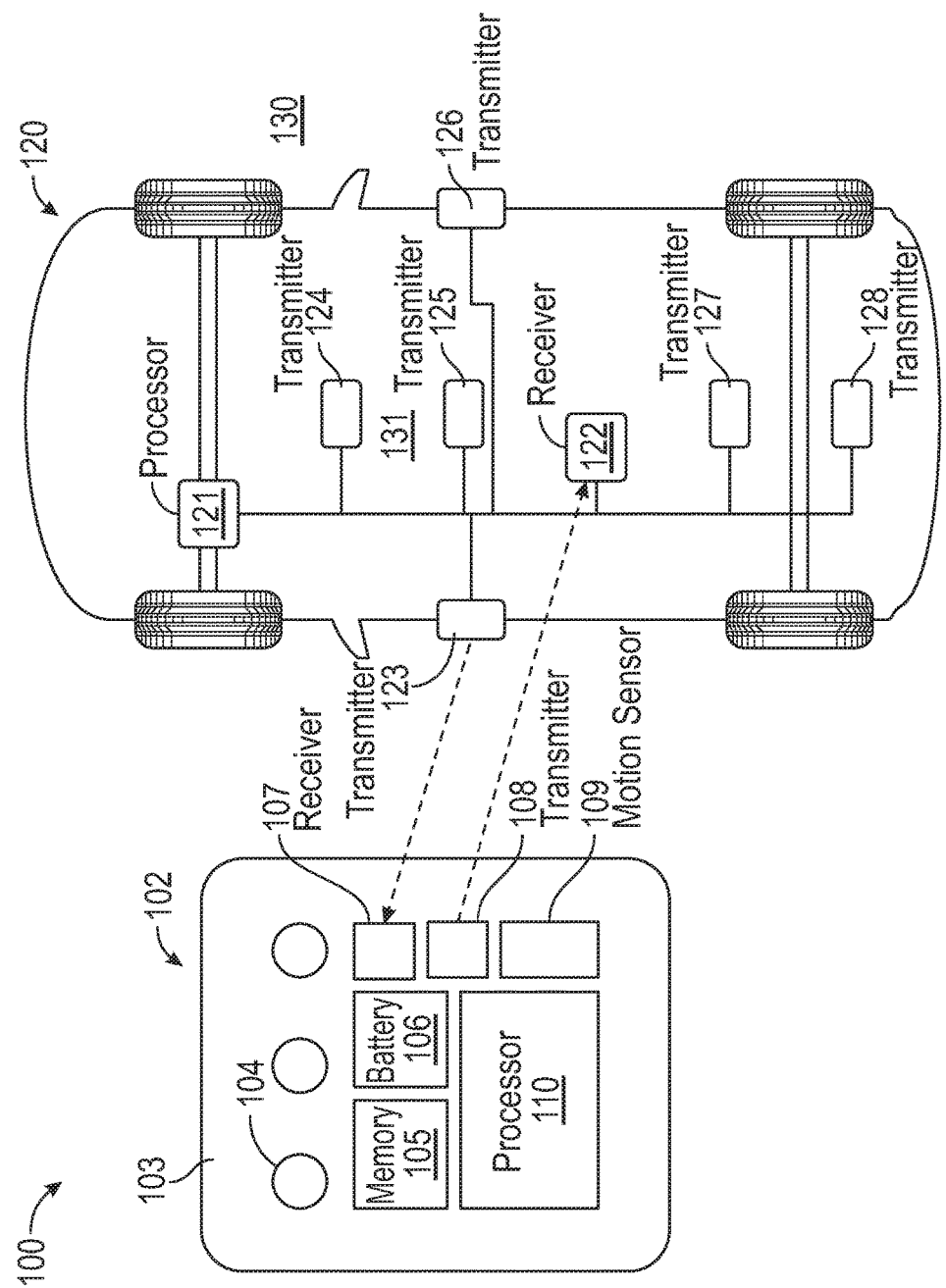
FIG. 1 is a conceptual block diagram illustrating a relay attack deterrence system in accordance with one embodiment.

In general, the subject matter described herein relates to improved systems and methods for preventing relay attacks associated with the use of key fobs and similar devices in conjunction with vehicle and other mobile platforms. In various embodiments, an action is taken based on both motion information (associated with the movement of the key fob device) as well as position information (associated with the relative position of the key fob device relative to the mobile platform). This action might include, for example, preventing entry to the mobile platform, preventing the activation of the mobile platform, producing an alarm signal, and disabling the receipt of requests for entry or requests for activation of the mobile platform.

As a preliminary matter, there is no intention to be bound by any expressed or implied theory presented in the preceding technical field, background, brief summary or the following detailed description. As used herein, the term module or control refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the illumination assemblies described herein are merely various exemplary embodiments of the present disclosure. For the sake of brevity, conventional techniques related to automotive security, wireless communication, vehicle networks, signal processing, data transmission, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a conceptual block diagram illustrating a relay attack deterrence system 100 in accordance with one embodiment. In general, system 100 includes a mobile platform 120 including a body control module (BCM) or other processing system 121, a plurality of mobile platform transmitter components 123-128 (e.g., low frequency antennas operating at about 125 KHz and having a range of about 2-5 meters) and a mobile platform receiver component 122 (e.g., an RF receiver operating at about 315-433 MHz and having a range of about 40-150 meters). Mobile platform 120 might include any structure or system of the type in which key fob devices are used to effect entry and/or activation, such as motor vehicles, marine vessels, aircraft, and the like. Without loss of generality, mobile platform 120 may be discussed herein the context of a traditional automotive vehicle, such as that shown in FIG. 1. The range of embodiments is not so limited, however. The various components of FIG. 1 may communicate with BCM 121 via a suitable bus or data communication system.

While six transmitter components 123-128 are shown in FIG. 1, any number of transmitter components may be used. As shown, transmitter components 123-128 may be distributed at various spatial locations relative to vehicle 120. For example, transmitter components 123 and 126 are generally adjacent to the driver and passenger doors, while transmitter components 124, 125, 127, and 128 are distributed along the longitudinal axis of mobile platform 120 within its interior (131). As described in further detail below, fob device 102 receives signals from each of the transmitter components 123-128, the relative strength of which may be used in part to determine position information related to fob device 102 with respect to mobile platform 120—e.g., whether the fob device 102 is located within the interior 131 or the exterior 130 of mobile platform 120. The position information also may include an indication of the position of fob device 102 with respect to the body of mobile platform 120, such as whether fob device 102 is adjacent one or more of the doors that can be used for entry.

Fob device 102 generally includes a housing 103, a fob receiver component 107 (e.g., a low-frequency antenna), a fob transmitter component 108 (e.g., an RF transmitter), a memory component 105, a processor 110, a power supply (e.g., battery 106), and a motion sensor component 109 configured to produce motion information. Motion sensor component 109 includes any combination of hardware and software configured to determine the relative motion of fob device 102. For example, motion sensor component 109 might be implemented as a multi-axis (e.g., 3-axis) accelerometer, global positioning system (GPS) device, pedometer, gyroscopic sensor, etc.

Memory component 105 and processor 110, along with suitable software provided therein, are configured to carry out the various methods described herein. In one embodiment, fob device 102 is configured to receive, at the fob receiver component 107, one or more signals from at least one of the plurality of mobile platform transmitter components 121-128. Fob device 102 is then configured to selectably transmit, to the mobile platform receiver component 122, a second signal (e.g., an encrypted signal including suitable instructions) based on the motion information (derived from motion sensor component 109) and position information derived from the one or more first signals (i.e., from transmitter components 121-128).

In one embodiment, the fob device 102 determines whether it is located within the interior 131 of the mobile platform 120 based on the position information and the motion information.

In another embodiment, the fob device 102 determines, based on the motion information derived from motion sensor component 109, whether it is being carried by a user in motion. That is, fob device 102 might use accelerometer data to determine whether the motion of fob device is consistent with human walking. Similarly, fob device 102 might determine whether it is stationary or whether it is located within mobile platform 120 while it that platform is moving.

In one embodiment, fob device 102 determines what action should be taken based on the position information and the motion information. In another embodiment, mobile platform 120 (e.g., BCM 121) determines the action to be taken (based on information sent by fob device 102).

The action to be taken will depend on a combination of the motion and position information as described above. Example actions include (1) preventing entry to the mobile platform 120, (2) preventing the activation of the mobile platform 120, (3) producing an alarm signal, and (4) disabling the receipt of requests for entry or requests for activation of the mobile platform. Any number of other actions may be taken, depending upon context and the nature of vehicle 120.

Figure 2:
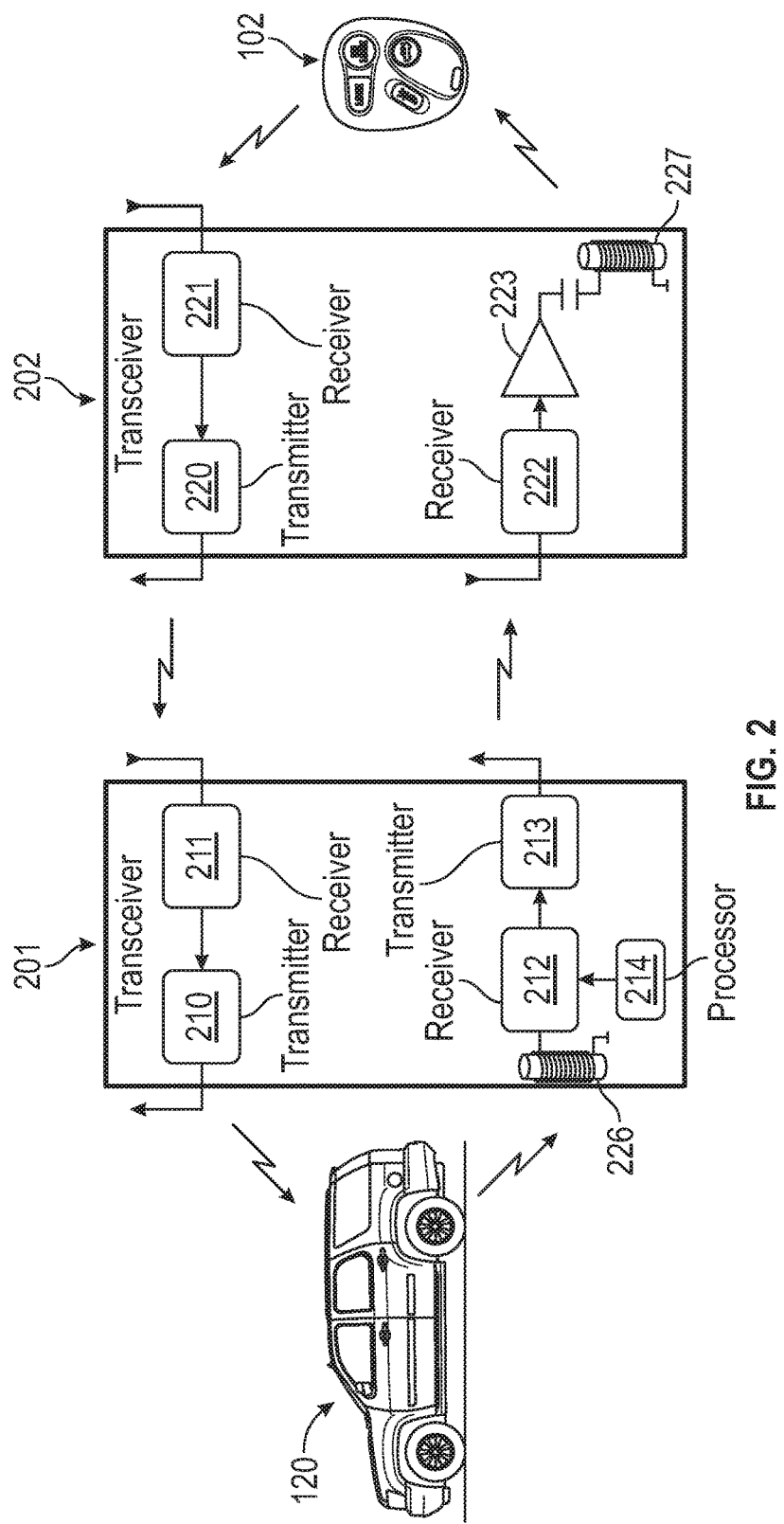
FIG. 2 is a conceptual block diagram illustrating an example two-party relay attack.

To further understand the nature of such attacks, and the advantages provided by the present system, consider the scenario illustrated in FIG. 2, which illustrates how an example two-party relay attack occurs. In general, two "thieves" (illustrated as two transceiver components 201 and 202) are effectively used to extend the range of communication between the mobile platform 120 and the fob device 102. Specifically, a low-frequency receiver 212 (with associated antenna 226 and microprocessor 214) receives the typical passive low frequency signal or signals transmitted by mobile platform 120. That signal is then transmitted via transmitter 213 (e.g., a long range 2.4 GHz transmitter) to a corresponding receiver 222 within transceiver component 202. This signal is then transmitted (via components 223 and 227) as a low frequency signal to fob device 102. That is, transceivers 201 and 202 have effectively relayed the low frequency signal from mobile platform 120 to fob device 102 in such a way that fob device 102 effectively believes it is within some predetermined range of mobile platform 120. As a result, fob device 102 transmits a corresponding RF signal to a receiver 221, which transmits that signal via transmitter 220 to receiver 211 within transceiver 201. That signal is then converted to the appropriate RF signal by transmitter 210 and sent to mobile platform 120, whereupon thief 1 may enter and/or active mobile platform without key fob 102 being in the vicinity.

Figure 3:
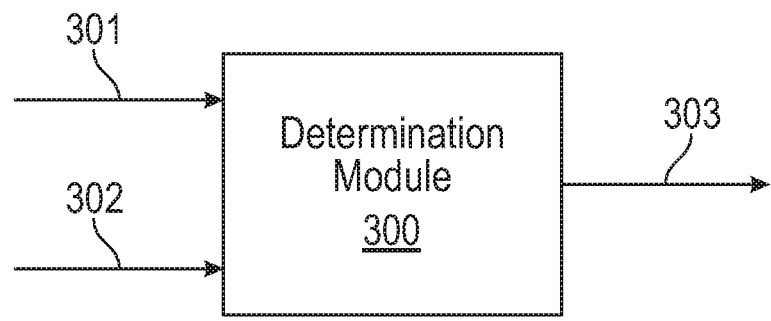
FIG. 3 is a conceptual block diagram illustrating the operation of a determination module in accordance with one embodiment.

As mentioned above, an advantage of the present system is that it takes into account not only the position of fob device 102 relative to mobile platform 120 (e.g., whether the fob device 102 is close enough that mobile platform 120 may be entered and/or started), but also takes into account the motion of fob device 102 (e.g., whether it is moving or stationary, the nature of the movement, how long it has been moving or stationary, etc.) Referring briefly to the conceptual block diagram of FIG. 3, operation of the system may be illustrated as a determination module 300 (including any suitable combination of hardware and software) that takes as its input position information 302 (e.g., range information derived from the signals received from the various low frequency transmitter components 123-128 incorporated into the mobile platform) as well as motion information 301 (e.g., accelerometer data from motion sensing component 109). By utilizing motion information 301, the vulnerability of system 100 to relay attacks can be greatly reduced.

In various embodiment, the position and motion information 302 and 301 may be used to in part to determine whether the fob device 102 is inside (131) or outside (130) of mobile platform 120. Based on that determination, passive entry and/or passive starting functions may be restricted. In other embodiments, passive entry and/or passive starting functions are allowed when fob device 102 is inside mobile platform 120 and the motion information 301 indicates that the fob device 102 is substantially stationary. In another embodiment, passive starting is restricted when it is determined that fob device 102 is in a "walking" state, as it is unlikely that a user would be walking while simultaneously attempting to start a vehicle.

In various embodiments, the system inhibits passive entry and/or passive starting when (a) fob device 102 is outside of mobile platform 120 and (b) there has been no motion for some predetermined amount of time (e.g., about 5 minutes).

In various embodiments, the system triggers some form of an alarm when (a) fob device 102 is outside of mobile platform 120, (b) there has been no motion for a predetermined interval (e.g., about 5 minutes), and (c) fob device 102 receives a passive entry and/or passive start request.

In another embodiment, fob device 102 disables reception of request from mobile platform 120 when there has been no motion for a predetermined amount of time (e.g., about 72 hours).

In another embodiment, a welcome lighting feature of mobile platform 120 is inhibited when there has been no motion of fob device 102 for a predetermined amount of time (e.g., about 5 minutes).

In some embodiments, fob device 102 determines that it is "outside" mobile platform 120 when fob device 102 responds to an exterior door handle passive request (e.g., via a side antenna component 123 or 126 in FIG. 1). The fob device 102 may also be considered outside when fob device 102 receives but does not respond to push button start requests, all-door closure requests, rear closure requests, or walkaway locking requests.

In some embodiments, mobile platform 120 determines that the fob device 102 is "outside" when the fob device 102 responds to an exterior door handle passive request (e.g., via a side antenna component 123 or 126 in FIG. 1). The fob device 102 may also be considered outside when BCM 121 receives but does not respond to push button start requests, all-door closure requests, rear closure requests, or walkaway locking requests.

Figure 4:
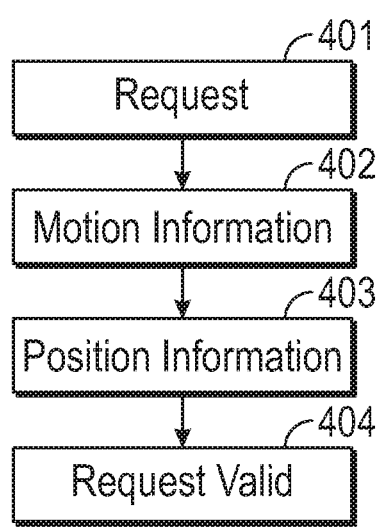
FIG. 4 is a flow-chart illustrating a method in accordance with one embodiment.

In summary, FIG. 4 is a high-level flow-chart illustrating a method in accordance with one embodiment. First, at step 401, a request is generated in response to fob device 102 receiving the low frequency signal from mobile platform 120. This request (e.g., a passive request) may be associated with opening a door of mobile platform 120, activating mobile platform 120, or the like. Next, in step 402, fob device 102 (e.g., processor 110) receives motion information from motion sensor component 109. Similarly, in step 403, fob device 102 receives position information (e.g., via low frequency transmitters 123-128). Utilizing the information received in steps 402 and 403, the system (in step 404) determines whether the request is valid. If the request is valid, fob device 102 may respond with the appropriate RF signal. Based on the motion information, fob device 102 may inhibit entry to mobile platform 120, turn off reception of authentication requests, and/or generate some form of alarm. In other embodiments, the information is transmitted to BCM 121 of mobile platform 120 and BCM 121 makes the decision as to whether the request is valid.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A relay attack deterrence system comprising:
   a mobile platform including a plurality of mobile platform transmitter components and a mobile platform receiver component provided therein;
   a fob device including a fob receiver component, a fob transmitter component, and a motion sensor component configured to produce motion information pertaining to a characteristic of movement of the fob device, the fob device configured to receive, at the fob receiver component, one or more first signals from at least one of the plurality of mobile platform transmitter components and to selectably transmit, to the mobile platform receiver component, a second signal based on the motion information and position information derived from the one or more first signals; and
   one or more processors that are configured to:
      determine whether the fob device is located within an interior of the mobile platform, using the position information, the motion information, or both; and
      selectively allow passive entry into the mobile platform, passive starting functions for the mobile platform, or both, based on both the characteristic of the movement of the fob device and determination was to whether the fob device is located within the interior of the mobile platform.

2. The system of claim 1, wherein the one or more processors are configured to determine whether the fob device is located within the interior of the mobile platform based on both the position information and the motion information.

3. The system of claim 2, wherein the one or more processors are configured to determine, based on the motion information, whether the fob device is being carried by a user in motion, and to selectively allow passive entry into the mobile platform, passive starting of the mobile platform, or both, based also on whether the fob device is being carried by a user in motion.

4. The relay attack deterrence system of claim 1, wherein one or more of the processors are disposed within the fob device.

5. The relay attack deterrence system of claim 1, wherein one or more of the processors are disposed within the mobile platform.

6. The relay attack deterrence system of claim 1, wherein the one or more processors comprise:
   a first processor disposed within the fob device, the first processor configured to determine the characteristic of movement of the fob device; and
   a second processor disposed within the mobile platform, the second processor configured to determine whether the fob device is located within the interior of the mobile platform.

7. The relay attack deterrence system of claim 1, wherein the one or more processors are configured to:
   determine that the fob device is located outside the interior of the mobile platform when the fob device responds to an exterior door handle passive request of the mobile platform.

8. The relay attack deterrence system of claim 1, wherein the one or more processors are configured to:
   determine that the fob device is located outside the interior of the mobile platform when the fob device receives but does not respond to one or more of the following: a push button start request, an all-door closure request, a rear closure request, or a walkaway locking request.

9. The relay attack deterrence system of claim 1, wherein the one or more processors are configured to:
  determine that the fob device is located outside the interior of the mobile platform when the fob device receives but does not respond to a push button start request.

10. The relay attack deterrence system of claim 1, wherein the one or more processors are configured to:
  determine whether the fob device is in a walking state, that is consistent with human walking with the fob device, based on the motion information; and
  selectively allow passive entry into the mobile platform, passive starting functions for the mobile platform, or both, based on whether the fob device is located within the interior of the mobile platform and whether the fob device is in the walking state.

11. The relay attack deterrence system of claim 10, wherein the one or more processors are configured to:
  selectively allow passive starting of the mobile platform when the fob device is both (a) stationary and (b) located within the interior of the mobile platform.

12. The relay attack deterrence system of claim 11, wherein the one or more processors are configured to:
  selectively disallow passive starting of the mobile platform when the fob device is in the walking state.

13. The relay attack deterrence system of claim 10, wherein the one or more processors are configured to:
  selectively disallow passive entry into the mobile platform, passive starting functions for the mobile platform, or both, when the fob device both (a) is located outside the interior of the mobile platform and (b) has been stationary for at least a predetermined amount of time.

14. The relay attack deterrence system of claim 10, wherein the one or more processors are configured to:
  selectively allow passive entry into the mobile platform and passive starting of the mobile platform when the fob device is both (a) stationary and (b) located within the interior of the mobile platform;
  selectively disallow passive entry into the mobile platform and passive starting of the mobile platform when the fob device is (c) in the walking state; and
  selectively disallow passive entry into the mobile platform and passive starting functions for the mobile platform, when the fob device both (d) is located outside the interior of the mobile platform and (e) has been stationary for at least a predetermined amount of time.

15. A fob device comprising:
  a processor;
  a fob receiver component;
  a fob transmitter component; and
  a motion sensor component configured to produce motion information pertaining to a characteristic of movement of the fob device;
  wherein the processor is configured to execute software code that performs the steps of:
    receiving one or more first signals from at least one of a plurality of mobile platform transmitter components external to the key fob device; and
    selectably transmitting, to a mobile platform receiver component, a second signal based on the motion information and position information derived from the one or more first signals, wherein the position information includes a determination as to whether the fob device is located within an interior of the mobile platform, and wherein the second signal comprises one or more instructions for selectively allowing passive entry into the mobile platform, passive starting functions for the mobile platform, or both, based on both the characteristic of the movement of the fob device and determination was to whether the fob device is located within the interior of the mobile platform.

16. The fob device of claim 15, wherein the processor is configured to:
  determine whether the fob device is in a walking state, that is consistent with human walking with the fob device, based on the motion information;
  selectively allow passive entry into the mobile platform and passive starting of the mobile platform when the fob device is both (a) stationary and (b) located within the interior of the mobile platform;
  selectively disallow passive entry into the mobile platform and passive starting of the mobile platform when the fob device is (c) in the walking state; and
  selectively disallow passive entry into the mobile platform and passive starting functions for the mobile platform, when the fob device both (d) is located outside the interior of the mobile platform and (e) has been stationary for at least a predetermined amount of time.

17. A relay attack deterrence method for a mobile platform, a mobile platform transmitter component, a mobile platform receiving component, and one or more processors, and a fob device, the method comprising:
  receiving, at the fob device, one or more first signals from at least one of a plurality of mobile platform transmitter components;
  selectably transmitting, to the mobile platform receiver component, a second signal based on motion information associated with the fob device and position information associated with the fob device based on the one or more first signals, the motion information pertaining to a characteristic of movement of the fob device, and the position information pertaining to a position of the fob device;
  determining, at the one or more processors, whether the fob device is located within an interior of the mobile platform, using the position information, the motion information, or both; and
  selectively allowing, via instructions provided by the one or more processors, passive entry into the mobile platform, passive starting functions for the mobile platform, or both, based on both the characteristic of the movement of the fob device and whether the fob device is located with the interior of the mobile platform.

18. The method of claim 17, further including determining, at the one or more processors, whether the fob device is located within the interior of the mobile platform based on the position information and the motion information.

19. The method of claim 18, wherein the one or more processors determine, based on the motion information, whether it is being carried by a user in motion, and selectively allow passive entry into the mobile platform, passive starting of the mobile platform, or both, based also on whether the fob device is being carried by a user in motion.

20. The relay attack deterrence method of claim 17, further comprising:
  determining, via the one or more processors, whether the fob device is in a walking state, that is consistent with human walking with the fob device, based on the motion information;

selectively allowing, via the one or more processors, passive entry into the mobile platform and passive starting of the mobile platform when the fob device is both (a) stationary and (b) located within the interior of the mobile platform;

selectively disallowing, via the one or more processors, passive entry into the mobile platform and passive starting of the mobile platform when the fob device is (c) in the walking state; and selectively disallowing, via the one or more processors, passive entry into the mobile platform and passive starting functions for the mobile platform, when the fob device both (d) is located outside the interior of the mobile platform and (e) has been stationary for at least a predetermined amount of time.

\* \* \* \* \*